(12) United States Patent
Lindner

(10) Patent No.: US 8,762,041 B2
(45) Date of Patent: Jun. 24, 2014

(54) METHOD, DEVICE AND SYSTEM FOR PRESENTING NAVIGATIONAL INFORMATION

(75) Inventor: Jeffery Erhard Lindner, Kitchener (CA)

(73) Assignee: BlackBerry Limited, Waterloo (CA)

( * ) Notice: Subject to any disclaimer, the term of this patent is extended or adjusted under 35 U.S.C. 154(b) by 337 days.

(21) Appl. No.: 12/819,521

(22) Filed: Jun. 21, 2010

(65) Prior Publication Data

US 2011/0313653 A1 Dec. 22, 2011

(51) Int. Cl.
*G01C 21/00* (2006.01)

(52) U.S. Cl.
USPC .............................................. 701/201; 705/3

(58) Field of Classification Search
USPC ....................................................... 701/201
See application file for complete search history.

(56) References Cited

U.S. PATENT DOCUMENTS

| | | | |
|---|---|---|---|
| 5,815,411 A | 9/1998 | Ellenby et al. | |
| 6,181,302 B1 | 1/2001 | Lynde | |
| 6,208,933 B1 | 3/2001 | Lazar | |
| 6,903,707 B2 | 6/2005 | Hobgood et al. | |
| 6,917,370 B2 | 7/2005 | Benton | |
| 7,089,110 B2* | 8/2006 | Pechatnikov et al. | 701/411 |
| 7,460,953 B2 | 12/2008 | Herbst et al. | |
| 7,511,736 B2 | 3/2009 | Benton | |
| 2006/0038833 A1 | 2/2006 | Mallinson et al. | |
| 2006/0177103 A1* | 8/2006 | Hildreth | 382/107 |
| 2006/0195858 A1 | 8/2006 | Takahashi et al. | |
| 2007/0088497 A1 | 4/2007 | Jung | |
| 2008/0039120 A1* | 2/2008 | Gad | 455/456.2 |
| 2011/0098918 A1* | 4/2011 | Siliski et al. | 701/201 |

FOREIGN PATENT DOCUMENTS

WO 2010012310 2/2010

OTHER PUBLICATIONS

Making Virtual Solid, LLC, "Virtual CableTM Car Navigation—Safe, Simple and Intuitive" (webpage), Jan. 29, 2010, http://www.mvs.net/.
Hu, Z. et al., Towards a New Generation of Car Navigation System—Data Fusion Technology in Solving On-Board Camera Registration Problem, Computer Science Department, Kumamoto University, Japan, 12 pages.
Ito, K. et al., Car Navigation System with Image Recognition, Abstract, Big. Techn. Papers—Intern. Conf. on Consumer Elect., Pioneer, 2009, 2 pages.
Hu, Z. et al., Vision-based Car Navigation System (webpage), Jan. 29, 2010, http://navi.cs.kumamoto-u.ac.jp/english/projects/08.html.
Tae-Hyun, H. et al., Detection of Traffic Lights for Vision-Based Car Navigation System, L.W. Chang, W.N. Lie and R. Chiang (Eds.): PSIVT 2006, LNCS 4319, pp. 682-691, 2006.

(Continued)

*Primary Examiner* — Hiep V Nguyen
(74) *Attorney, Agent, or Firm* — MBM Intellectual Property Law LLP

(57) ABSTRACT

A method and apparatus for presenting navigational information for a mobile device. The mobile device is configured to determine its location, for example via GPS. One or more input images and navigational information are obtained. The input images may be obtained, for example, via a camera. One or more output images are generated by processing the input images to integrate the obtained navigational information. Processing of the input images includes recognizing one or more objects in the input images. The recognized objects may be indicative of navigational instructions, for example, a navigation route.

21 Claims, 7 Drawing Sheets

(56) References Cited

OTHER PUBLICATIONS

Nakatsuru, T. et al., Image Overlay on Optical See-through Displays for Vehicle Navigation, Proceedings of the Second IEEE and ACM International Symposium on Mixed and Augmented Reality, 2003.

"Instar—Car Navigation (2002)—Ars Electronica Futurelab" (video) http://www.youtube.com/watch?v=sPCk2vGk8g0.

"IPhone Augmented Reality Navigation" (video) http://www.youtube.com/watch?v=rgXzdUb_fug.

"AugSatNav—Augmented Reality Navigation System by Phyora" (video) http://www.youtube.com/watch?v=nFJRGab4oKQ.

"Augmented Reality on Android—DailyMobile.se" (video) http://www.youtube.com/watch?v=PdmSVCDmJGA.

Azuma, R., A Survey of Augmented Reality, Presence: Teleoperators and Virtual Environments 6, Aug. 4, 1997, p. 355-385.

"Augmented Driving" (video) http://www.dailymotion.com/video/xcyr2b_augmented-driving_auto?start=57.

\* cited by examiner (a)

(b)

(c)

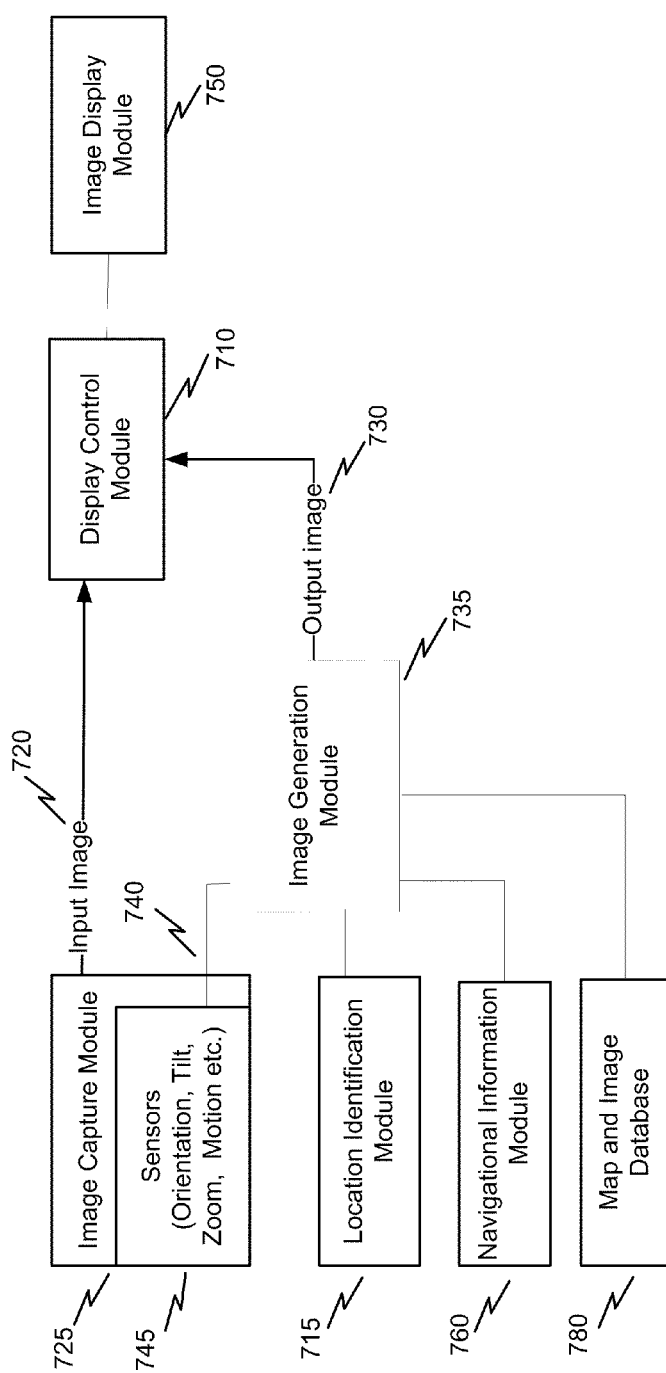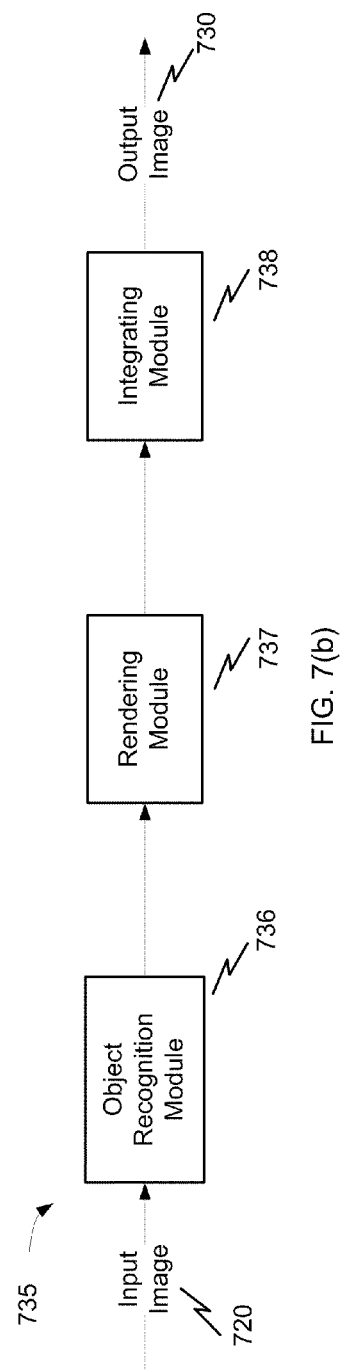
FIG. 7(a)
FIG. 7(b)

US 8,762,041 B2

METHOD, DEVICE AND SYSTEM FOR PRESENTING NAVIGATIONAL INFORMATION

CROSS-REFERENCE TO RELATED APPLICATIONS

This is the first application filed for the present technology.

TECHNICAL FIELD

The present disclosure relates generally to mobile electronic devices and, in particular, to techniques for presenting navigational information on a mobile device.

BACKGROUND

Mobile devices such as hand-held GPS units and in-vehicle GPS units have been developed for providing navigation guidance. Wireless communication-enabled mobile devices such as GPS-enabled cellular telephones, smart phones, handheld PDAs and the like have also been equipped with navigation functionality for providing navigation guidance. These devices are configured to determine the location of the mobile device, to allow a user to specify a destination and to provide navigational information for traversing a route from the current location to the specified destination.

Navigational information, such as turn-by-turn route guidance instructions, are typically presented to the user either visually on a display, audibly via a speaker, or both. Typically, the navigational information is presented as directional arrows on maps showing the user's current location, text displayed on the mobile device screen and as audio alerts such as "turn left now". The user is required to correlate the information provided with the observed environment, potentially resulting in delays and errors.

BRIEF DESCRIPTION OF THE DRAWINGS

Further features and advantages of the present technology will become apparent from the following detailed description, taken in combination with the appended drawings, in which:

FIG. 7(a) illustrates a block diagram of an exemplary system configured for presenting navigational information in accordance with embodiments of the present technology;

FIG. 7(b) illustrates a block diagram of an exemplary image generation module for generating an output image from an input image in accordance with embodiments of the present technology;

It will be noted that throughout the appended drawings, like features are identified by like reference numerals.

DETAILED DESCRIPTION

The present technology generally provides a method, mobile device and computer program product for presenting navigational information.

Accordingly, an aspect of the present technology is a method comprising: obtaining one or more input images; generating one or more output images by obtaining navigational information for the mobile device and processing the one or more input images to integrate the obtained navigational information, wherein processing the one or more input images includes recognizing one or more objects in the one or more input images; and providing the one or more output images for presentation.

Another aspect of the present technology is a computer program product comprising code adapted to perform acts associated with the foregoing method when the code is loaded into memory and executed on a processor of a mobile device.

Yet another aspect of the present technology is a mobile device configured to obtain one or more input images, generate one or more output images by obtaining navigational information and processing the one or more input images to integrate the navigational information, wherein processing the one or more input images comprises recognizing one or more objects in the one or more input images, and to provide the one or more output images for presentation.

The details and particulars of these aspects of the technology will now be described below, by way of example, with reference to the attached drawings.

Figure 1:
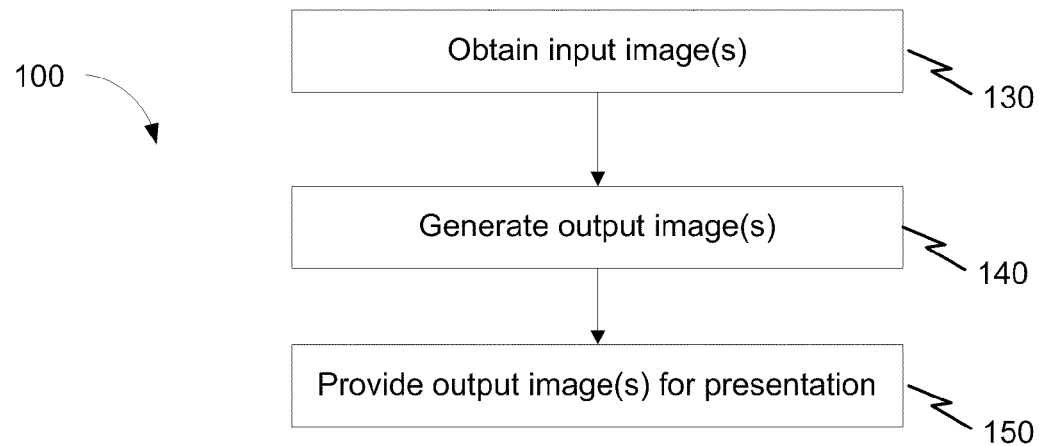
FIG. 1 is a flowchart of a method for presenting navigational information for a mobile device in accordance with embodiments of the present technology.

FIG. 1 illustrates a method 100 for presenting navigational information for a mobile device in accordance with embodiments of the present technology. Referring to FIG. 1, the method 100 comprises obtaining one or more input images 130, generating one or more output images 140 by processing of the input images to integrate navigational information therein, and presenting the one or more output images 150.

Exemplarily, an input image of a user's current location may be obtained from the camera on the user's mobile phone. The obtained image may be processed to recognize the streets shown in the input image and an output image may be presented highlighting the street comprising the navigation route in the input image.

Embodiments of the present technology, as described herein, may be used in a variety of augmented reality applications such as automobile and pedestrian navigation, electronic tourist guides, gaming applications and activities such as geocaching and the like.

Input Image

An image is captured by an image-capturing device such as a still camera, video camera, infra-red camera or the like. In some embodiments, the captured image is indicative of a current location of the mobile device. For example, the video camera of a mobile device may be used to continuously obtain an image at the user's current location. In some embodiments, the captured image is indicative of a destination for the mobile device. Exemplarily, a tourist wishing to find a route to a particular landmark may capture an image including the landmark, for example in the distance, using the mobile device camera. The user may then specify the landmark as a desired destination by indicating it on the captured image.

The image may be captured in a suitable image format as would be readily understood by a worker skilled in the art. Formats for capturing images may include raw image formats, Joint Photographic Experts Group File (JPEG) and the like for still and video images and interlaced and progressive scanning formats for digital video images.

The captured image, hereinafter referred to as the input image, is converted to a digitized representation if it is not in a digital format. The digitized representation comprises pixels with image parameters such as resolution, pixel density, pixel bit depth, image size and magnification based in part on the image-capturing device.

The input image may be stored in a proprietary or standard digital image format, as would be readily understood by a worker skilled in the art. Standard digital formats for still images include raster formats such as Joint Photographic Experts Group File Interchange Format (JPEG/JFIF), Tagged Image File Format (TIFF), raw image formats, Graphics Interchange Format (GIF), Tagged Image File Format (TIFF), Bitmap and the like, and vector formats, such as Computer Graphics Metafile (CGM), Scalable Vector Graphics (SVG), Encapsulated Postscript (EPS), Windows Metafile (WMF), Enhanced Metafile (EMF) and the like. Standard digital formats for moving images include H-261, Theora and Moving Picture Experts Group (MPEG) formats such as MPEG-1, MPEG-2, MPEG-4 and the like.

In some embodiments, processing of the input image comprises converting the image from one format to another, for example to decompress the input image, and to convert it to a format amenable to selectable modification of pixels in the input image. In some embodiments, if the image corresponds to a still image contained in a compressed video file, processing of the image comprises reconstructing the still image from the compressed video file, as would be readily understood by a worker skilled in the art.

The input image may also be associated with image parameters such as the location, orientation, tilt and zoom that may be used for processing of the input image. The image parameters may be obtained from sensors operatively associated with the image-capturing device.

The input image, as referred to herein, may be a frame from a series of images captured periodically at a given frame rate or it may be a still image captured substantially immediately prior to processing and subsequent output of a processed image.

The input image may be subjected to various pre-processing operations such as resampling, noise reduction, image stabilization and the like. For example, the image may be resampled in order to change the size of the image to fit the dimensions of the display. Noise reduction and image stabilization may be necessary to improve the quality of the image before it can be subjected to more detailed processing. The pre-processing step may also include adjustments to image attributes such as color, balance, brightness, luminance, lighting, saturation and contrast.

Processing of Input Image

An output image is formed by processing the input image to integrate navigational information therein. For example navigational information may be integrated into the input image as a visual representation appearing in the output image.

Navigational information as used herein may comprise information that may be relevant to a user at a current location or for a user traversing a route. For example, navigational information may comprise map information, a visual representation of route information, places of interest along the route or at the current location, weather and traffic information, route directions, travel speed, or the like, or a combination thereof.

Figure 2:
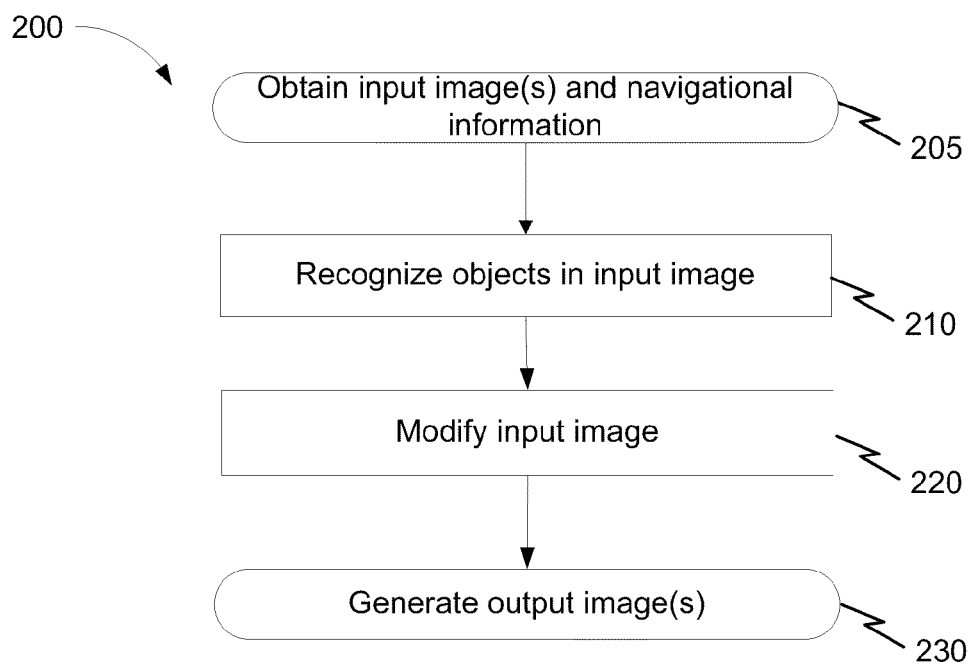
FIG. 2 is a flowchart of a method of processing an input image in accordance with embodiments of the present technology.

FIG. 2 is a flowchart illustrating the steps involved in a method 200 for generating an output image by processing of the input image in accordance with embodiments of the present technology. The method 200 comprises obtaining an input image and navigational information 205, recognizing one or more objects 210 in the input image, processing the input image 220, at least in part based on the one or more objects recognized, to integrate navigational information with the input image, and generating the output image 230.

Exemplarily, an object such as a street along which navigation route proceeds may be recognized 210 in the input image and the input image may be modified 220 to highlight the navigation route along the recognized street.

Accordingly, processing the input image to integrate navigational information may comprise recognizing one or more objects in the input image.

In some embodiments, processing the input image to integrate navigational information further comprises modifying the input image at least in part based on the one or more objects recognized. Modifying the input image may comprise adding, modifying, removing or replacing one or more objects from the input image.

In some embodiments, processing of the input image is performed by the mobile device. In some embodiments, the processing is performed at a remote server, exemplarily operated by a service and application provider. In some embodiments, the processing is performed by both. The distribution of processing may be based on factors such as the computational capabilities of the respective processing modules, communications capabilities between the mobile device and the remote server and the availability of databases for maps and images. One or more load balancing activities may be performed for the distribution of the processing burden, as would be readily understood by a worker skilled in the art.

Recognizing Objects in the Input Image

The input image is processed to recognize objects. Recognizing objects in the input image, as used herein, may comprise identifying pixels in the image that correspond to particular objects such as a particular street or building.

In some embodiments, the objects recognized in the input image include objects related to navigational information, for example, objects that are indicative of navigational instructions wherein such objects are called navigational objects. Navigational objects may include objects such as streets, intersections, buildings, landmarks, traffic lights and signs, turns, roundabouts, dead ends and the like. In some embodiments, the objects recognized in the input image also include other objects such as cars, trees, people and the like. Accordingly, the step of recognizing may comprise distinguishing or differentiating navigational objects from other objects.

In some embodiments, recognizing objects in the input image comprises distinguishing or detecting objects such as streets, buildings, vehicles and the like. In some embodiments, recognizing objects further comprises identifying particular instances of more general objects. For example, the image is first processed to detect the portions of the image that represent the "street". Then, the one or more objects classified as "street" may be identified as a specific street by name, for example, "First Ave", "Second Ave.", etc."

Thus, the image is processed to distinguish objects such as the street from the rest of the image which might contain other objects such as lawn, sidewalks, buildings, and the like. Detection of particular objects in an image may be performed using various object recognition and pattern detection techniques that will be readily known to a worker skilled in the art. Detection of particular instances of objects may be aided by information regarding location of the image, for example using GPS coordinates acquired when capturing the image.

Object and pattern recognition techniques and algorithms are well known in various fields related to computer vision such as facial detection, baggage scanning, etc. Typical object recognition techniques comprise segmenting the image into segments or sets of pixels that share some common visual characteristic using techniques such as contrast enhancement. The segmented regions or objects may be subjected to feature extraction. Typical features detected by feature extraction algorithms include edges, corners, blobs and ridges. Other properties such as colour, texture, shape and size of the objects may also be analyzed. Various rough and detailed classification steps may be successively applied to the objects to compare their feature sets with a set of standard patterns such as patterns for tree, car, street, etc. stored in a database and to determine the object classes.

The objects detected in the input image may be identified by comparing the input image to maps or other images stored in a database. In order to facilitate retrieval of relevant maps and images, the input image may be tagged with information related to location in which the image was captured in addition to parameters such as the tilt, orientation, scale and field of view of the image-capturing device used to capture the input image. Exemplarily, location information may be obtained from a GPS receiver, orientation information from a magnometer, tilt information from tilt sensors and information related to the scale of the input image and its field of view may be derived from the zoom parameter of the image capturing device.

Databases containing extensive automobile and pedestrian navigation maps are well-known and widely used in various navigation devices and applications. Such databases may be stored locally on a mobile device or on a remotely accessible server. Some applications also provide images of locations and routes in addition to map and terrain information. Exemplarily, the images may be stored in the database and the database entry may be linked to or tagged with reference to the location in the captured image. For example, a reference may indicate New York City, Times Square, north-west corner, latitude and longitude. Images in a database may also be stored with reference to image-capturing device parameters such as the location, orientation, tilt and magnification of the image-capturing device. For example, a reference may indicate: New York City, Times Square, south-west corner, latitude and longitude, facing N15W.

In some embodiments, an input image is processed to distinguish and identify objects in a predetermined portion of the input image, for example in the entire input image or a particular quadrant of the input image. For example, all the buildings, streets and landmarks appearing in the input image may be identified. In some embodiments, target objects are specified and the input image may be processed to recognize the specified target objects which may or may not be navigational objects. For example, the image may be processed to recognize one or more navigational objects including streets representing the navigation route and one or more landmarks appearing along the navigation route.

In some embodiments, processing an input image to detect target objects therein comprises as a first step, determining an approximate region where a particular target object, for example the navigation route, is expected to be detected. An approximate region of the input image may be identified for each target object by comparing the input image to maps and images in a database. This approximate region of the image may then be subjected to further detailed processing to distinguish the pixels in the input image representing the target objects. For example, the approximate region of the input image where the navigation route is expected to be detected may be further processed to distinguish pixels representing the navigation route from pixels representing other objects such as sidewalks, neighbouring buildings etc.

In some embodiments, in order to detect a particular target object in successive input images (such as successive frames captured by a video camera), the series of input images are compared using information related to the motion of the image-capturing device. Once a particular object of interest (for example, a building) has been recognized in a first input image, the position of this particular object (for example, the building), and thus the pixels corresponding to this object of interest, may be predicted in succeeding input images using information known about the motion of the image-capturing device. For example, if a particular building is identified in a first input image, and the mobile device is known to have moved 20 m to the right when the second input image is captured, the location of the pixels representing the particular building in the second input image can be estimated based on the knowledge that the field of view has shifted to the right compared to the first input image by an amount corresponding to approximately 20 m. Motion of the mobile device may comprise changes in position as well as orientation and tilt of the image capturing device. Accordingly, various sensors for detecting position and motion such as GPS receivers, magnometers, tilt sensors, gyros, and accelerometers may be provided to detect various aspects of motion. A worker skilled in the art will be familiar with appropriate sensors for detection of motion and position. Motion information may be obtained for either or both of the image-capturing device and the mobile device.

In some embodiments, processing an input image to recognize target objects comprises recognition of a reference object. The reference object may be a particular landmark building, a particular corner of a building, a traffic light, a tree or other prominent object in an input image. For example, an input image may be quickly scanned to determine the location of this reference object. The location of other objects in relation to the location of the reference object may be known, either based on a previous input image or based on maps or images obtained from the database. Accordingly, once the reference object has been recognized in an input image, other objects in the input image may be detected based on the location of the reference object and its relationship to the other objects.

Modifying the Input Image

In some embodiments, processing the input image further comprises modifying the input image to integrate navigational information. Navigational information may be obtained based at least in part on a determination of the location of the mobile device, and optionally based on one or more objects recognized in the input image. The one or more objects may be navigational objects or other objects.

In some embodiments, the input image is modified at least in part based on one or more objects recognized in the input image. The one or more recognized objects may be navigational objects or other objects.

The input image may be modified to add, remove or modify objects in the input image. In some embodiments, the objects are indicative of navigational information. For example, graphical, textual or symbolic objects may be added to the image. As another example, objects in the input image such as particular buildings may be outlined or highlighted. As yet another example, an object obstructing the entrance to a building may be removed.

In some embodiments, the input image is modified to outline particular objects. For example, when the navigation route is to be outlined, the boundary between the street and the sidewalk may be outlined with a white line. Accordingly, in some embodiments, the method comprises distinguishing streets from sidewalks using techniques such as contrast enhancement, edge extraction and the like, for example as described herein.

In some embodiments, an object is outlined by changing the colour of the pixels corresponding to the extracted edges of the object. The outline may be a continuous solid line or a line pattern such as a dashed or dotted line. The colour may be changed to a predetermined value, changed from its initial colour by a predetermined amount, or a combination thereof, or the like, so as to make the outline readily identifiable.

In some embodiments, the input image is modified to highlight particular objects in the input image. For example, a particular restaurant or street in the image may be highlighted in yellow. The object may be identified using object recognition techniques known in the art.

Figure 3:
FIG. 3 is an exemplary illustration, in accordance with embodiments of the present technology, of modifying the input image.

In some embodiments, an object is highlighted by modifying the colour of the pixels corresponding to the object in the input image. Objects in the input image may be highlighted with a uniform translucent or opaque color or with a pattern such as a hatched pattern. FIG. 3 is an exemplary illustration of modifying an input image to highlight and outline particular objects in accordance with embodiments of the present technology. FIG. 3(a) shows an image of a street as captured by a camera. Accordingly, FIG. 3(a) may be considered to be the input image 310 for the purposes of this example. FIG. 3(b) is a line drawing 305 of the input image 310 indicating the main features of the input image as well as the modifications to highlight 320, outline 330 and add objects 340, 350, 360. For clarity, hatched lines have been used to represent a translucent highlight. FIG. 3(c) shows the resulting output image created by modifying the obtained input image 310 to highlight a navigation route 320 and outline a destination 330. Additionally, text objects 340, 350 and 360 respectively indicating the street name, end of the route and the destination address have been added to the input image. In some embodiments, the input image is modified to add rendered objects on the input image. The objects may be navigational objects or other objects. In some embodiments, the rendered object comprises a rendered outline of the object (for example, a wireframe outline). The outline may be a line rendered with a predetermined point size or dash pattern.

In some embodiments, a rendered object comprises a rendered body. The object may be rendered by filling its interior with a pattern, color or color gradient. For example, the object may be rendered with a uniform color or a hatch pattern. The object may be rendered as opaque or translucent.

In some embodiments, both the outline and body of an object are rendered. Accordingly, the outline may be rendered to be distinct from the body of the object.

The object may be rendered as a planar and two-dimensional object or as a three-dimensional object. In some embodiments, objects are rendered to match the depth and perspective of the input image.

In some embodiments, the rendered object corresponds to an existing object in the input image. For example, the outline of a building in the input image may be rendered. The outline may be rendered, at least in part, by utilizing the recognized edges of the building. Similarly, an object in the input image may be highlighted by filling the interior of the rendered object with the desired highlight colour, or modifying all or a portion of the rendered object colour so as to make it stand out as an object of interest.

In some embodiments, the rendered objects are indicative of a part of an object in the input image. For example, the input image may be modified to render a particular lane on a multi-lane highway.

Figure 4:
FIG. 4 is an exemplary illustration, in accordance with embodiments of the present technology, of modifying the input image.
Figure 4:
Figure 4:

In some embodiments, the rendered object is indicative of an imaginary object. For example, for a pedestrian navigating a route through an open space such as a field or a square, an outline of the navigation route through the field or square (i.e. a "route" shaped object) may be rendered on top of the field or square as recognized in the input image. The route object may be scaled and shaped at least in part based on the recognizing of the square, streets and buildings around the square, and optionally other objects such as trees etc. on the square. Referring to FIG. 4, a pedestrian navigation route through a square is exemplarily rendered on an input image. FIG. 4(a) shows an input image as obtained from a camera, FIG. 4(b) is a line drawing of the obtained input image indicating the square 410 and the rendered pedestrian route 420 through the square. FIG. 4(c) shows the output image created by rendering a navigation route 420 on the square 410 of the input image.

In some embodiments, the input image is modified to render objects on the input image that may be at least partially missing from the input image as captured by the image-capturing device.

In some embodiments, the rendered object is indicative of an object interior to or otherwise obstructed by an object in the input image. For example, the image may be modified to render an outline of a path obstructed by a vehicle or to render an object indicating a café inside a building.

In some embodiments, the rendered object is indicative of an object partially or completely obscured in the image due to poor visibility conditions such as fog or poor light. Accordingly, the input image may be modified to add objects to aid navigation in poor visibility conditions. For example, the outline of a path not clearly visible due to foggy conditions may be added to the input image.

In some embodiments, the rendered object overlaps, at least partially, with one or more objects in the input image. The rendered object may be, at least partially, in front of or behind other objects in the input image. The rendered object may be, at least partially, in front of some objects as well as at least partially behind other objects in the input image. For example, the street to be highlighted may be partially blocked by a car on the street. Accordingly, in order to highlight the street, the rendered street object can be placed behind the car.

In some embodiments, the input image may be modified to add textual objects. The text may be related to navigation instructions, speed of travel, time or distance remaining to destination, information related to objects in the field of view, weather information, or other information. For example, the text may be added to label streets and landmarks in the input image.

In some embodiments, the input image is modified to add symbolic objects. Exemplarily, a left turn icon may be added to indicate an upcoming turn.

In some embodiments, objects added to the input image are based on a user specification or a user preference. For example, a user may select a mode where the street names will be displayed but not other points of interest.

As another example, the user can select a "parking" mode when attempting to park a car. The input image, in this mode may be modified to render an outline of a car, scaled to have the size of the user's car and placed in various possible parking spots in the vicinity to indicate to the user whether or not the car will fit in that spot.

In some embodiments, a user may select an object in an input image which will be highlighted whenever it appears in the field of view. For example, the user may specify a destination by selecting a landmark in the input image. Accordingly, the landmark may then be highlighted whenever it appears in the field of view. As another example, a tourist wandering around in a neighbourhood can keep themselves oriented with respect to a particular building or a tree in a park by specifying that it always be outlined when it appears in the field of view. In some embodiments, an indication of the landmark is included in the output image even when it is obstructed. In some embodiments, when the landmark is not within the field of the output image, an arrow may appear at an edge of the output image indicating the location of the landmark.

In some embodiments, the input image is modified to render the navigation route. Optionally, the input image may be modified to render one or more alternate or additional navigation routes. The navigation routes or paths may be ranked or prioritized based on different parameters such as condition of route, length of route, difficulty of route, parameters related to terrain such as elevation changes, congestion and traffic along route, time of day, and the like. The user may specify one or more preferred parameters or preferred routes. In some embodiments, the route may be rendered in a colour indicative of a ranking or priority level assigned to the route. For example, a preferred safe navigation route may be rendered in green while an alternate navigation route may be rendered in a red colour.

In some embodiments, the route is rendered in a colour, colour gradient or range of colours indicative of a particular aspect of the route. For example, the colour of the route may be indicative of aspects such as elevation, changes in elevation, condition of the route, and the like.

In some embodiments, the input image is modified to improve user perceptibility. For example, image properties such as the colour, saturation, brightness, contrast, size of image or field of view may be configured to facilitate perception of objects in the output image.

In some embodiments, the input image is modified to change the colour of one or more objects. In some embodiments, the colour of substantially the entire image is modified. For example, the input image may be modified to be in monochrome while one or more objects (such as the navigation route or the building comprising the destination) may be rendered in colour.

Rendering Objects

In some embodiments, the objects added to the input image are rendered based, at least in part, on one or more objects recognized in the image.

In some embodiments, the objects added to the input image are placed or aligned based, at least in part, on one or more objects recognized in the image. For example, a text label for a street in the input image may be placed on the object recognized as "First Street" in the image. As another example, a path through a park may be placed in the middle of the object recognized as the park in the image.

In some embodiments, objects are rendered at least in part based on the location, size and shape of one or more objects in the image. For example, the rendered route object 420 in FIG. 4 is scaled for the size of the object recognized as square in the input image. The path is shaped based on detecting in the input image, the user's current location and the street to which the user is headed.

In some embodiments, the objects added to the input image are placed or aligned based, at least in part, on the context. For example, in order to indicate an upcoming left turn to a user traversing a route along "First Street", a left turn arrow may be placed on the object recognized as "First Street".

In some embodiments, the colour in which an object is rendered is selected based on the colour of one or more objects recognized in the input image. For example, the text may be in a dark colour if placed on a light background of sky but light if placed on a dark background of trees.

In some embodiments, the rendering of objects may be indicative of the objects being navigational objects or other objects. For example, the colour, texture or outline pattern of the rendered navigation route may be selected to be different from that used for other objects.

In some embodiments, objects are rendered at least in part using maps and other images stored in a database. For example, when the view of the street ahead is blocked by a vehicle, maps and images in the database may be retrieved and utilized to determine how the street continues beyond the blocking vehicle. For example, the street may continue straight then turns right after 10 m. Accordingly, an outline of the route beyond the vehicle may be rendered, based on the information retrieved from the database, and placed on top of the vehicle in the image, or otherwise blended into the image to convey continuity of the route past the obstruction.

In some embodiments, an object is rendered by modifying a previously rendered object in accordance with information obtained about the motion of the image capturing device. Accordingly, a previously rendered object, such as a building or street, may be moved, rotated, scaled based on knowledge of the translational, rotational or tilt movement of the image-capturing device. A worker skilled in the art will be familiar with various techniques for transforming objects. Exemplarily, an outline of a building may be rendered on a first input image. If the image-capturing device is known to have moved 20 m towards the building, the rendered outline of the building may be scaled accordingly for the subsequent input image. Such scaling of a building may further depend on the initial and final absolute distance to the building, along with other factors.

Objects may be rendered using rendering techniques familiar to a worker skilled in the art (for example, pixel-by-pixel rendering, rasterization, ray casting, etc.). The selection of rendering technique used may depend on processing capacity, processing time available, frame rate for capturing images or updating images on the display.

Generating the Output Images

In some embodiments, the output image is created by modifying pixels in the input image. The pixels modified correspond to the one or more objects to be modified or added to the input image. For example, when an object (for example a building) is to be highlighted, the object representing the building is first identified in the image using object recognition techniques. Then, the colour of the pixels corresponding to the building is modified to show the building as highlighted in that colour. Similarly, an object may be outlined by modifying the colour of the pixels that correspond to the edges of the object in the input image.

In some embodiments, the output image is created by modifying a subset of the pixels in the input image corresponding to an object to be modified or added. For example, in order to highlight the navigation route with a translucent effect, a subset of the pixels (in an alternating hatch pattern) corresponding to the navigation route may be changed in colour. Similarly, a navigation route may be outlined by a dotted or dashed line by modifying the colour of a subset of pixels (in the appropriate pattern for producing a dashed or dotted effect) representing the edges of the route.

In some embodiments, objects to be added to the input image are placed on one or more layers distinct from the layer containing the input image. The output image is created by combining the layers with the input image using techniques for combining layers as would be readily known to a worker skilled in the art. For example, the output image may be created by combining a first layer containing the input image with a second layer containing the rendered route.

Objects added to the input image may be translucent or opaque. A worker skilled in the art will be familiar with various methods of indicating the degree of transparency of a pixel and for combining or blending layers with overlapping objects of different transparency. For example, in alpha compositing techniques for combining overlapping objects of differing transparency, the degree of transparency may be indicated by an alpha value defined to range between 0 for completely opaque to 1 for completely transparent. The transparency of each pixel may be stored in its alpha channel. The layers may be combined using alpha compositing rules which would be readily known to a worker skilled in the art.

Figure 5:
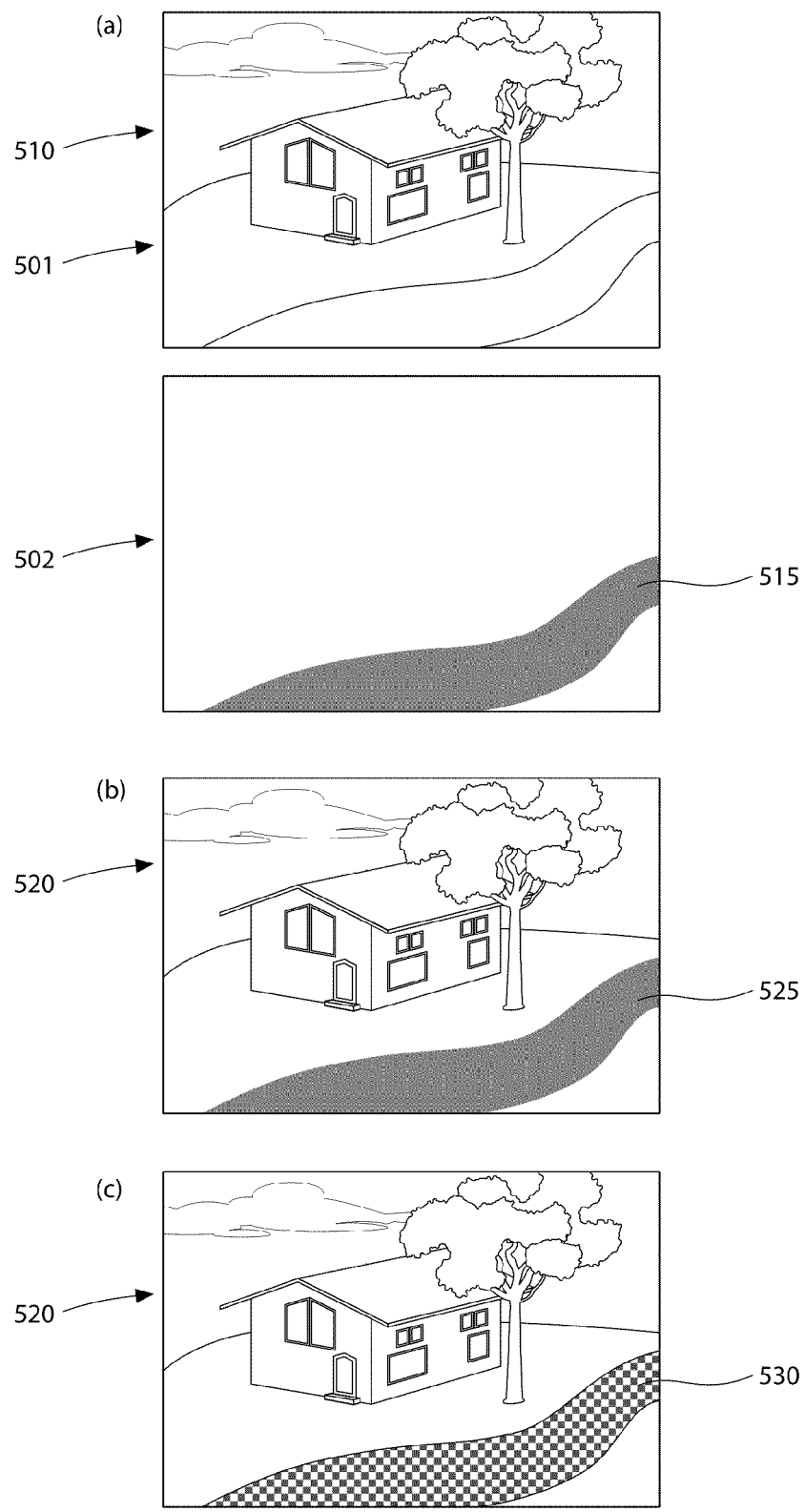
FIG. 5 illustrates an exemplary method of creating an output image by combining two layers in accordance with embodiments of the present technology.

FIG. 5 illustrates an exemplary method of creating an output image to highlight a street in the input image in accordance with embodiments of the present technology. FIG. 5(a) shows the input image 510 on a first (bottom) layer 501. For purposes of illustration, the input image 510 is depicted as a line drawing. A second (top) layer 502 is created and an object corresponding to the street 515 is rendered on this layer. The street is rendered by filling the pixels on the second (top) layer 502 corresponding to the street 515 with the desired highlight colour (for example, grey in FIG. 5(a)). The two layers may be combined to produce an output image 520 as shown in FIG. 5(b) or 5(c). For a street rendered as opaque, the layers 501 and 502 will be combined such that the pixels 525 of the output image 520 in the position of the street 515 will be substantially entirely those of the top layer 502 as shown in FIG. 5(b). As shown in FIG. 5(c), if a translucent effect is desired for the highlighted street in the output image 520, the pixels 530 of the output image 520 in the position of the street, will alternately be those of the input image on the bottom layer and the rendered street on the top layer.

In some embodiments, a plurality of objects are added to the input image to create the output image. The objects may be placed on the same layer or on different layers. Accordingly, each layer may comprise one or more objects. An object on a layer may be individually positioned and altered without affecting other objects on that layer or on other layers.

In some embodiments, a rendered objects overlaps with other rendered objects or objects in the input image. The rendered objects may be placed in front of some objects and behind other objects. Placing a first object in front of other objects may be accomplished by placing the first object in a top layer and placing objects behind the first object in lower layers and so on. The overlapping objects placed on different layers may be combined sequentially using information about the transparency of the objects on each layer.

Figure 6:
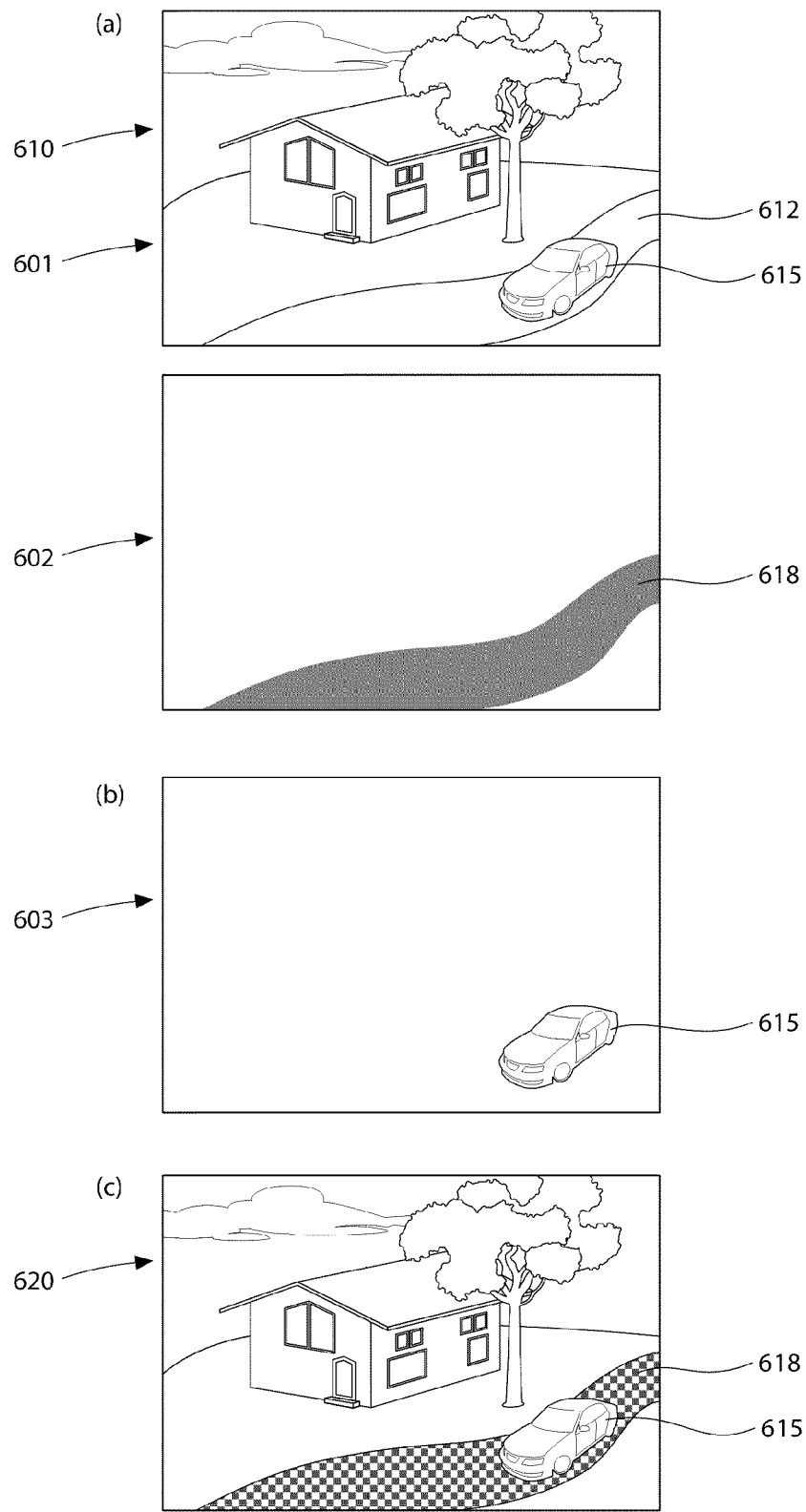
FIG. 6 illustrates an exemplary method of creating an output image by combining three layers in accordance with embodiments of the present technology.

FIG. 6 illustrates an exemplary method of combining layers containing overlapping objects in accordance with embodiments of the present technology. FIG. 6(a) shows an exemplary input image 610 with a street 612 and a car 615 on the street 612. For purposes of illustration, the input image is shown as a line drawing. In order to render a navigation route comprising on this street 612, the "rendered route" object 618 has to be placed above the "street" 612 in the image but below the "car" 615 of the image. Exemplarily, this may be achieved by processing the input image to recognize the pixels corresponding to the car 615 and creating a third layer with pixels corresponding to the car. In this example, the first (bottom) layer 601 comprises the input image 610, the second (middle) layer 602 comprises the rendered route 618 and the third (top) layer 603 comprises the car 615 of the input image 610. Additionally, the pixels corresponding to the car on the third layer may be defined as opaque and the pixels on the second layer corresponding to the rendered route may be defined to be "translucent". The output image 620 is created by combining the layers 603, 602, and 601, from top to bottom such that in the position of the car 615, the pixels of the output image contain pixels of the third layer 603. The pixels of the output image in the position of the rendered route 618 contain pixels alternately taken from the second layer 602 and the first layer 601. In the remaining parts of the output image, the pixels correspond to the pixels of the input image taken from the first layer 601.

In some embodiments, objects added to the input image for the formation of the output image are updated at different rates. In some embodiments, objects on a layer may be updated at the same rate while objects on different layers may be updated at different rates. For example, one layer may contain objects that are relatively static (for example text indicating the temperature) while another layer may contain more dynamic objects (for example the rendered route). Accordingly, some layers integrated with the input image may be updated more frequently than others.

Presenting the Output Image

As mentioned above, an output image, formed by processing the input image to integrate navigational information, is presented on the mobile device.

As mentioned previously, the input image may need to be re-sampled if the pixel dimension of the image capturing device are different from those of the display module. In some embodiments, the input image is re-sampled before processing of the input image. In some embodiments, the input image is re-sampled after it has been processed to recognize objects and before objects have been rendered. In some embodiments, the re-sampling is performed after the input image has been modified to integrate navigation information and before the resulting output image is displayed on the display module.

In some embodiments, there is a delay time between capturing of an input image and presentation of the corresponding output image. The delay time may be fixed and predetermined. For example, the delay time may be based on the parameters such as amount of processing required, the processing capacity, the frame rate at which the input image is obtained, delay to compensate for vibrations, or other sources of delay. In some embodiments, aspects of processing of the input image, such as selection of rendering or recognition algorithms, is based, at least in part, on the delay time.

In some embodiments, the delay time is variable and a maximum delay time is defined. In some embodiments, the maximum delay time is defined based on the motion of the mobile device. For example, the output image may be updated more frequently when the mobile device is moving more rapidly so that the image on the display corresponds closely to the user's view. The motion may be either related to changes in location or orientation. If a delay time is expected to exceed a maximum delay time, the delay time may be reduced, for example by sacrificing image quality.

In some embodiments, if the processing time for integrating navigational information with the input image exceeds the maximum delay time, an intermediate output image is presented for display while the processing continues. In some embodiments, the intermediate output image is the input image as captured. In some embodiments, the intermediate output image is the input image at an intermediate stage of processing, for example, when some of the layers containing navigational information have been updated and integrated with the input image but other layers have not yet been updated or integrated.

The output image is presented on one or more displays associated with the mobile device. In some embodiments, the presentation of the output image is accompanied by audio alerts and notifications presented on an audio output device such as a speaker. In some embodiments, the presentation of the output image is also be accompanied by tactile alerts. For example, a tactile or audio alert may be issued to indicate that the image capturing device is facing away from the navigation route.

Computer Program Product

Acts associated with the method described herein can be implemented as coded instructions in a computer program product. In other words, the computer program product is a computer-readable medium upon which software code is recorded to execute the method when the computer program product is loaded into memory and executed on the microprocessor of the mobile device.

Acts associated with the method described herein can be implemented as coded instructions in plural computer program products. For example, a first portion of the method may be performed using one mobile device, and a second portion of the method may be performed on another mobile device or a device such as a server, or the like. In this case, each computer program product is a computer-readable medium upon which software code is recorded to execute appropriate portions of the method when a computer program product is loaded into memory and executed on the microprocessor of a mobile device.

Mobile Device

Embodiments of the present technology may be implemented on a mobile device. The mobile device may be a cellular telephone, satellite telephone, smartphone, PDA, laptop, net book, a tablet PC, a portable navigation system such as a handheld or vehicular GPS unit, or another device that can be configured to allow a determination of its location. Additional types of mobile devices would be readily known to a worker skilled in the art.

In some embodiments, the mobile device comprises a display control module. The display control module may be configured to obtain one or more input images and one or more output images and to control presentation of the obtained output images which are generated by obtaining navigational information and processing the input image at least in part based on the obtained navigational information, for example to integrate said navigational information.

FIG. 7(a) is a schematic of an exemplary configuration utilizing a display control module in accordance with embodiments of the present technology. The display control module 710 obtains one or more input images 720 from an operatively linked image-capturing module 725. The display control module 710 obtains one or more output images 730 from an operatively linked image generation module 735. Optionally, additional parameters (tilt, motion, etc.) 740 may also be obtained by the display control module 710. The display control module then provides the one or more output images for presentation by one or more operatively linked image display modules 750.

A processing module may be operatively coupled with the display control module, image capturing module, the image generation module and the image display modules. The processing module may be configured to coordinate the functions of the various modules and to process different types of data using one or more processors. In some embodiments, the processing module is integrated with the display control module. In some embodiments, the processing module is the display control module. In some embodiments, the processing module comprises or is operatively associated with a memory module configured for storage of different types of data. Appropriate processing and memory modules would be readily understood by a worker skilled in the art.

In some embodiments, the mobile device comprises a location identification module 715. The location identification module is configured to allow a determination of location of the mobile device.

In some embodiments, the location identification module comprises a GPS receiver. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multinational Galileo system being developed by the European Union, in collaboration with China, India, Morocco, Saudi Arabia and South Korea, Russia's GLONASS system, India's proposed Navigational Satellite System (IRNSS), and Japan's proposed QZSS regional system.

In some embodiments, the mobile device comprises an image-capture module 725 configured to capture one or more images. In some embodiments, the image-capture module may be integrated or operatively coupled with one or both of the display control module and the image generation module.

In some embodiments, the image-capture module is integrated or operatively associated with sensors 745 such as tilt sensors, orientation sensors, accelerometers, light sensors and the like. In some embodiments, sensor modules are further configured to process signals detected by the sensors.

In some embodiments, the mobile device comprises one or more image parameter modules configured to determine parameters indicative of the captured images including but not limited to tilt parameter, orientation parameter, zoom parameter, motion parameter, and light parameter. In some embodiments, the image parameter modules are integrated or operatively connected with the respective sensor modules. The image parameter modules may be integrated or operatively connected with one or both of the display control and image generation modules.

In some embodiments, the mobile device comprises one or more image display modules 750. The image display modules may be communicatively coupled or integrated with one or more of the display control module, the image generation module and the image-capture module.

The image generation module 735 is configured to obtain one or more input images from an image capture module and generate one or more output images at least in part based on the obtained input image. In some embodiments, the image generation module generates the one or more output images by processing the obtained one or more input images to integrate navigational information obtained from a communicatively linked navigational information module 760 wherein processing the one or more input images includes recognizing one or more objects in the one or more input images.

In some embodiments, the mobile device is communicatively linked to an image generation module 735. In some embodiments, the image generation module 735 is located remotely at one or more servers accessed via a network.

In some embodiments, the mobile device comprises an image generation module 735. The image generation module may be integrated or operatively linked with the display control module 715. The image generation module may be integrated or operatively linked with the image-capture module.

In some embodiments, an image generation module is communicatively linked to one or more map and image databases 780 storing map and image information. In some embodiments, one or more map and image databases are stored locally in the image generation module. In some embodiments, one or more map and image databases are communicatively linked to the image generation module. In some embodiments, the map and image databases are located remotely at one or more map and image servers accessed via a network.

Referring to FIG. 7(*b*), an image generation module in accordance with embodiments of the present technology is shown. The image generation module 735 comprises an object recognition module 736 configured to process the input image to recognize one or more objects. The image generation module 735 also comprises an object rendering module 737 configured to render objects indicative of navigational information and at least in part based one or more objects recognized in the input image. The image generation module 735 also comprises an integration module 738, configured to integrate the navigational information with the input image.

The processing required for the generation of the output image may be performed by the mobile device, by a server managed exemplarily by a service and application provider, or by a combination of both. Information used in said processing may at least partly be stored on the mobile device, on a server of a service and application provider, or on a server of a data and content provider communicatively linked with the appropriate processing entities, such as described above, or a combination thereof. In some embodiments, the distribution of the processing burden is based on the amount of data available for processing and the available communication bandwidth for data transfer between the various processing entities.

Referring to FIG. 7(*a*), In some embodiments, the mobile device comprises a navigational information module 760 configured to obtain location data from the location identification module and generate navigational information, such as navigational instructions, at least in part based on the obtained location data. In some embodiments, one or more map databases with map information are stored locally in the navigational information module. In some embodiments, one or more map databases are communicatively linked to the navigational information module. In some embodiments, the map databases are located remotely at one or more map servers accessed via a network. The navigational information module may be integrated or operatively coupled with one or both of the location identification module and the image generation module.

In some embodiments, one or more remote servers monitor the current location of a user, for the purpose of obtaining real-time information, such as traffic updates and other location based services. Accordingly, the mobile device may be configured to regularly update its location information with the server. In some embodiments, the server also serves to provide navigation information based, at least partly, on the current location of a user. Accordingly, the mobile device may be configured to provide other route related requests to the server.

In some embodiments, the mobile device comprises one or more sensing modules including but not limited to light sensors and accelerometers. In some embodiments, the sensor modules are further configured to process signals detected by the sensors.

In some embodiments, the mobile device is communicatively coupled to one or more external devices. For example, the mobile device may be coupled to a windshield mounted camera or to car stereo speakers and display. The mobile device may be communicatively coupled to the external devices by means of a wireless or a hard-wired connection. Wireless communication can be achieved using any short-range or long-range communication protocols that may be readily known to a worker skilled in the art. For example, the mobile device may be linked to some external devices using Bluetooth™ and to others using radio frequency transmission. Accordingly, the mobile device may comprise additional short-range and long-range communication modules. Examples of short-range communications modules include a Bluetooth™ module, an infrared module with associated circuits and components, and a TEL MUTE line for communication with similarly linked devices.

Figure 8:
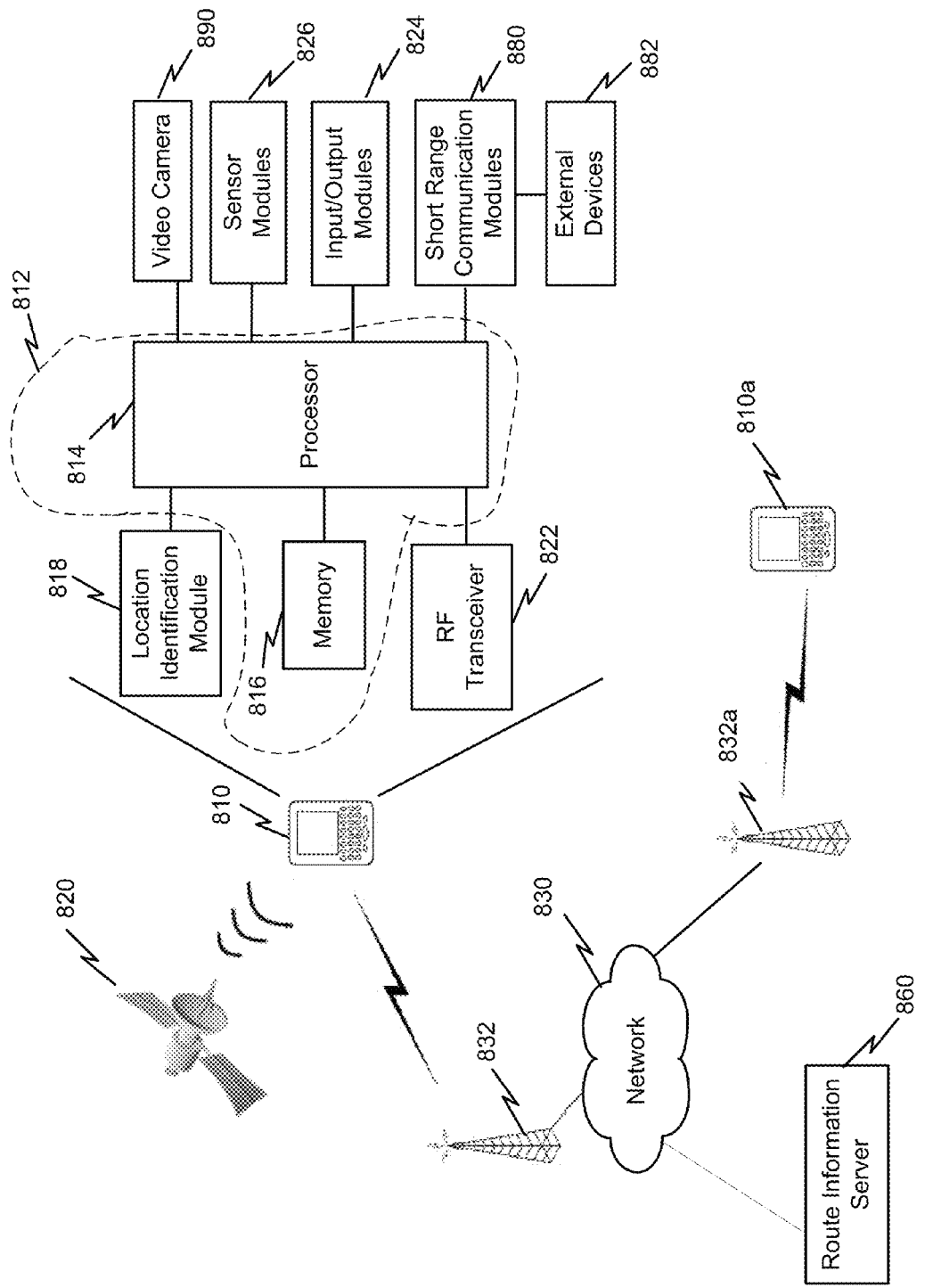
FIG. 8 illustrates a block diagram of an exemplary mobile device in accordance with embodiments of the present technology.

FIG. 8 shows a block diagram depicting certain main components of an exemplary mobile device 810 with wireless communications capability in accordance with embodiments of the present technology. It should be understood that this figure is intentionally simplified to show only certain components; the mobile device 810 may include other components beyond those shown in FIG. 8.

The mobile device 810 is operatively associated with a GPS system 820 allowing for determining its location. The mobile device 810 is linked to a cellular network 830 through a base-station 832, and thereby to one or more servers of a service and application provider, and to one or more servers of a data and content provider. Additional mobile devices 810*a* may be linked to the cellular network 830 using the same base station 832 or a separate base station 832*a*. The cellular network 830 thus serves for data transfer between peer mobile devices 810, 810*a*.

The mobile device 810 further comprises a location identification module 818, which is configured to determine the location of the mobile device. In this embodiment, the location identification module 818 includes a GPS receiver chipset for receiving GPS radio signals transmitted from the one or more orbiting GPS satellites 820. The GPS receiver chipset can be embedded within the device or externally connected, such as, for example, a Bluetooth™ GPS puck or dongle. Other systems for determining location may be used in place of GPS, as would be readily understood by a worker skilled in the art. Navigational notifications are generated at least in part based on location data from the location identification module 818.

The device 810 comprises a processing module 812, which includes a microprocessor 814 (or simply a "processor") and operatively associated memory 816 (in the form of RAM or flash memory or both), to enable a variety of device functions and to execute an operating system for running software applications loaded on the device. The processing module 812 is configured to obtain one or more input images exemplarily from a video camera 890, to obtain navigational information and instructions exemplarily from a remote server, to generate an output image and to control the display of the output image exemplarily by one or more displays 824. The output image is generated by processing the input images to integrate the obtained navigational information wherein processing the input images includes recognizing one or more objects in the input images.

The mobile device 810 includes a radiofrequency (RF) transceiver 822 for communicating wirelessly with the base station 832 of a wireless network 830. The base station 832 may be a cellular base station, wireless access point, or the like. The base station 832 may vary as the mobile device travels, for example, using well-known handoff processes in cellular networks. The RF transceiver 822 may optionally be alternatively or additionally used for communicating directly with a peer device such as a third party mobile device, for example as may occur in some ad-hoc networks. The RF transceiver enables access to a wireless communication channel for transmitting and receiving data. The RF transceiver 822 may further allow for a wireless voice channel for transmitting and receiving voice communications, for example concurrently with transmission and reception of data over the same or a separate logical or physical channel.

The mobile device 810 sends and receives communication signals via the RF transceiver 822. When communicating wirelessly with a base station 832 of a wireless network 830, the mobile device 810 may communicate in accordance with one or more appropriate technologies such as: Global Systems for Mobile communications (GSM), General Packet Radio Service (GPRS), Code Division Multiple Access (CDMA) technologies, Wideband CDMA (WCDMA), whether 2G, 3G, High speed packet access (HSPA), Universal Mobile Telecommunication System (UMTS) based technologies, Long Term Evolution (LTE) technologies, Orthogonal Frequency Division Multiplexing (OFDM) technologies, Ultra-Wideband (UWB) technologies, WiFi™ or WiMAX™ technologies, or other communication technologies and protocols as would readily be understood by a worker skilled in the art. In some embodiments, the mobile device 810 may be capable of operation using multiple protocols. The base station 832 may be part of a wireless network, such as a cellular network, local-area network, wide-area network, wireless hotspot network, or the like. The mobile device, base station, network components, and the like, may be configured for data communication, voice communication, or a combination thereof, possibly using additional components, configurations and procedures where appropriate, such as SIM cards, authorization and authentication procedures, handoff procedures, and the like, as would be readily understood by a worker skilled in the art.

Referring to FIG. 8, the mobile device 810 is linked to route information servers 860 which may include public or private route information servers. The route information servers are typically map servers that provide map data to networked computing devices or mobile devices upon request, for example, in vector format or alternatively as bitmaps. In addition to providing the map data, the route information servers (e.g. the map servers) can also provide route instructions or route directions which are turn-by-turn instructions for each decision point along the route. These route information servers are communicatively connected to the for transmitting route information to each mobile device 810 in response to location data received from each mobile device. The "location data" comprises (1) the current location of the respective mobile device, e.g. its GPS position fix, which is used to represent the starting location, and (2) the destination location, which has been received wirelessly from the sender. The location data may also include a default location that has been specified, set or preconfigured by the sender or by the recipient for use in generating the route information in the event that the current location cannot be determined.

The mobile device comprises one or more input/output devices or user interfaces (UI's) 824. The mobile device 810 may include one or more of the following: a display (e.g. a small LCD screen), a thumbwheel and/or trackball, a keyboard, a touch screen, a keypad, a button, a speaker, a still camera and a video camera. The mobile device comprises one or more sensor modules 826 including but not limited to a microphone, an orientation sensor, an accelerometer, a light sensor etc.

The mobile device comprises short-range communication modules 880 for communication between the mobile device and other similarly enabled external devices 882. For example, short-range communication modules 880 may include a Bluetooth communication module for communicating with a windshield mounted camera or a car stereo display. These devices 882 may also be used exemplarily to obtain information about the current location or to display navigational information.

This technology has been described in terms of specific implementations and configurations (and variants thereof) which are intended to be exemplary only. The scope of the exclusive right sought by the applicant is therefore intended to be limited solely by the appended claims.

The invention claimed is:

1. A method of presenting navigational information on a mobile device, the mobile device configured to determine its location, the method comprising:
    obtaining, by the mobile device, one or more input images;
    obtaining navigational information for the mobile device, said navigational information including two or more alternative navigation routes, wherein each of the two or more alternative navigation routes is assigned a ranking based on one or more route parameters;
    processing the one or more input images to integrate the obtained navigational information, wherein processing the one or more input images includes recognizing one or more objects in the one or more input images;
    rendering two or more route objects, wherein each of the two or more route objects is indicative of a respective one of the two or more alternative navigation routes and is further indicative of the assigned ranking of the respective one of the two or more alternative navigation routes;
    generating one or more output images comprising the two or more route objects integrated with the one or more input images; and
    providing the one or more output images for presentation, wherein one or more of obtaining navigation information, processing, rendering, generating and providing is implemented by the mobile device, and optionally in conjunction with a communicatively linked remote server.

2. The method of claim 1 wherein recognizing one or more objects comprises recognizing one or more navigational objects, each navigational object indicative of one or more navigational instructions.

3. The method of claim 1 wherein processing the one or more input images comprises detecting one or more objects in the one or more input images.

4. The method of claim 1 wherein processing the one or more input images comprises identifying one or more objects in the one or more input images.

5. The method of claim 1 wherein at least one recognized object is a navigation route.

6. The method of claim 1, wherein at least one recognized object is recognized based on a user specification.

7. The method of claim 1, further comprising modifying the one or more input images by modifying colour of one or more objects depicted therein.

8. The method of claim 1 further comprising modifying the one or more input images by adding one or more objects.

9. The method of claim 1 further comprising modifying the one or more input images by modifying or removing one or more objects of the one or more input images.

10. The method of claim 1, wherein rendering one or more objects is based at least in part on one or more objects recognized in said input image.

11. The method of claim 1, wherein rendering one or more objects comprises rendering the outlines thereof.

12. The method of claim 1, wherein rendering one or more objects comprises rendering the bodies thereof.

13. The method of claim 1, wherein at least one of the one or more rendered objects is indicative of a navigation route.

14. The method of claim 1, wherein at least one of the rendered objects is indicative of a destination.

15. The method of claim 14 wherein said destination is determined by recognizing one or more objects in said input image.

16. The method of claim 1 wherein said processing is performed, at least in part, by the communicatively linked remote server.

17. The method of claim 1, wherein the ranking is based on one or more of: condition of the route, length of the route, difficulty of the route, parameters relating to terrain of the route, congestion and traffic along the route and time of day.

18. The method of claim 1, wherein colour of the rendered route objects is indicative of said ranking.

19. A mobile device configured to present navigational information, the mobile device configured to determine its location, the mobile device comprising:
   a display control module configured to obtain one or more input images;
   obtain navigational information for the mobile device, said navigational information including two or more alternative navigation routes, wherein each of the two or more alternative navigation routes is assigned a ranking based on one or more route parameters;
   recognize one or more objects in the one or more input images;
   render two or more route objects, wherein each of the two or more route objects is indicative of a respective one of the two or more alternative navigation routes and is further indicative of the assigned ranking of the respective one of the two or more alternative navigation routes;
   generate one or more output images comprising the two or more route objects integrated with the one or more input images; and
   provide the one or more output images for presentation.

20. The mobile device of claim 19, further comprising one or more of the following:
   (i) an image capture module communicatively linked to the display control module and configured to capture the input images and provide the input images to the display control module;
   (ii) an image display module communicatively linked to the display control module and configured to present the output images;
   (iii) an orientation sensor module operatively linked to the image capture module and configured to sense orientation of the image capture module;
   (iv) a tilt sensor module operatively linked to the image capture module and configured to sense a tilt angle of the image capture module; and
   (v) a motion sensor module operatively linked to the image capture module and configured to sense motion of the image capture module.

21. A computer program product for presenting navigational information for a mobile device configured to determine its location, said computer program product comprising code which, when loaded into a memory and executed on an associated processor, is adapted to perform the following:
   obtaining one or more input images;
   obtaining navigational information for the mobile device, said navigational information including two or more alternative navigation routes, wherein each of the two or more alternative navigation routes is assigned a ranking based on one or more route parameters;
   recognizing one or more objects in the one or more input images;
   rendering two or more route objects, wherein each of the two or more route objects is indicative of a respective one of the two or more alternative navigation routes and is further indicative of the assigned ranking of the respective one of the two or more alternative navigation routes;
   generating one or more output images comprising the two or more route objects integrated with the one or more input images; and
   providing the one or more output images for presentation.

* * * * *